(No Model.)

C. FERGUSON.
CLOTHES BASKET.

No. 276,377.  Patented Apr. 24, 1883.

Attest:
Charles Pickles
Wm. F. Sayers

Inventor:
Caroline Ferguson
By Knight Bros
Attys

UNITED STATES PATENT OFFICE.

CAROLINE FERGUSON, OF ST. LOUIS, MISSOURI.

CLOTHES-BASKET.

SPECIFICATION forming part of Letters Patent No. 276,377, dated April 24, 1883.

Application filed October 25, 1882. (No model.)

*To all whom it may concern:*

Be it known that I, CAROLINE FERGUSON, of the city of St. Louis, in the State of Missouri, have invented a certain new and useful Improvement in Clothes-Baskets, of which the following is a full, clear, and exact description.

My invention relates to a basket for holding dirty clothes prior to washing.

My improvement consists in novel features hereinafter fully described, and pointed out in the claims, whereby a receptacle is provided for holding light fine wear—such, for instance, as laces, handkerchiefs, &c.—and thus keeping them separate from the heavier coarser articles which are contained in the basket proper. The object of thus keeping these small and delicate articles separate from the heavier, larger, and coarser ones is to prevent their being damaged and sometimes lost, and it also saves considerable time by avoiding the necessity of picking over the articles to separate them before washing.

In order that the invention may be fully understood, I will proceed to describe it with reference to the accompanying drawings, in which—

Figure 1:
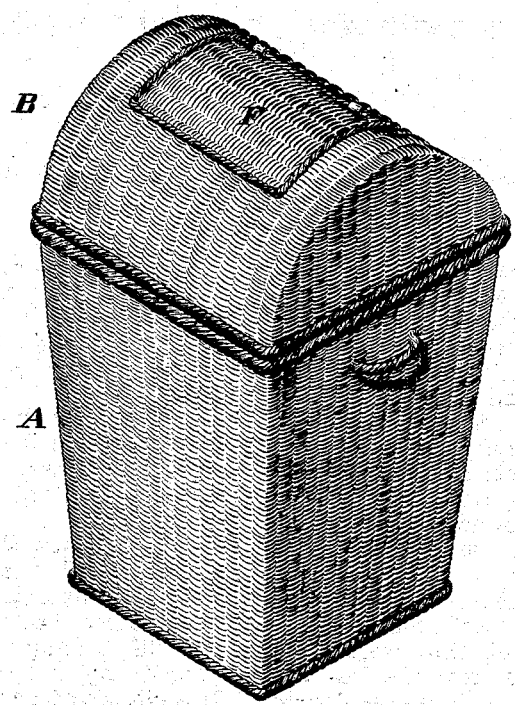
Figure 2:
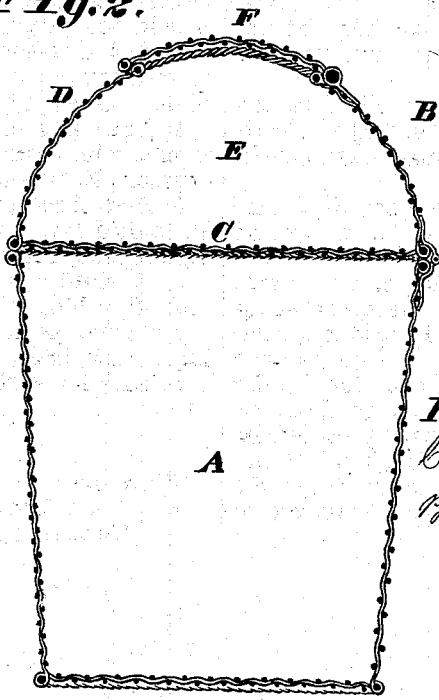

Figure 1 is a perspective view of my improved clothes basket. Fig. 2 is a vertical section thereof.

A is the body, and B the lid, of the basket. The body is of usual form, there not being anything peculiar about its construction. The lid is hollow, and consists of a lower part or bottom, C, and an upper part or top, D, the latter being preferably arched in form, as shown. A receptacle, E, is thus provided for the purpose stated. The lid is hinged to the body, and has an opening in its top to permit access to the receptacle. The receptacle is closed by a hinged cover, F.

If desired, the lid may be secured to the basket in an inverted position—that is, the arched part D may be put down into the basket, the opening to the receptacle being made in the part C of the lid; but I prefer the form shown.

I do not claim, broadly, to be the first to form a receptacle in the lid of a vessel, for I am aware that powder-boxes and other boxes, cases, and baskets of that character have been made.

Having thus described my invention, the following is what I claim as new therein and desire to secure by Letters Patent:

1. A clothes-basket having a lid and a top to said lid, forming a receptacle between said lid and its top, and an opening in said top.

2. A clothes-basket having a hollow lid provided with an opening in the top and a cover to said opening, as set forth.

3. A clothes-basket having a hollow lid and an opening in the top of said lid closed by a hinged cover, as set forth.

4. The combination, with body A, of a lid formed with parts C and D, providing a receptacle, E, as set forth.

5. A clothes-basket having a lid, C, a top, D, to said lid, the two forming a receptacle, E, and an opening in said top, as set forth.

6. A clothes-basket consisting of body A and lid, B hinged together, the latter consisting of lower part, C, and upper part, D, forming a receptacle, E, closed by a cover, F, all substantially as shown and described.

CAROLINE FERGUSON.

Witnesses:
 SAML. KNIGHT,
 GEO. H. KNIGHT.